United States Patent [19]

Geel

[11] Patent Number: 4,747,346
[45] Date of Patent: May 31, 1988

[54] METHOD OF STENCIL PRINTING A SUBSTRATE WITH FOAM

[75] Inventor: Adam P. Geel, Doorwerth, Netherlands

[73] Assignee: Lantor B.V., Netherlands

[21] Appl. No.: 39,122

[22] Filed: Apr. 16, 1987

Related U.S. Application Data

[63] Continuation-in-part of Ser. No. 677,480, Dec. 3, 1984, abandoned, and a continuation-in-part of Ser. No. 823,534, Jan. 29, 1986.

[30] Foreign Application Priority Data

Jan. 29, 1985 [NL] Netherlands .................. 8500242

[51] Int. Cl.$^4$ .......................... B41M 1/12; D06P 1/00
[52] U.S. Cl. .................... 101/129; 101/116; 101/426; 8/477; 427/212; 427/288; 428/283
[58] Field of Search ............ 101/114, 116, 119, 120, 101/129, 426; 8/477, 929; 68/200; 118/213, 301, 406; 427/212, 256, 258, 288, 373, 389.9; 428/283, 313.3, 313.5, 402

[56] References Cited

U.S. PATENT DOCUMENTS

| | | | |
|---|---|---|---|
| 3,934,502 | 1/1976 | Marino | 101/119 |
| 4,061,001 | 12/1977 | von der Eltz et al. | 8/477 |
| 4,275,655 | 6/1981 | Artaud et al. | 101/129 |
| 4,299,591 | 10/1981 | Gregorian et al. | 8/477 |
| 4,365,968 | 12/1982 | Gregorian et al. | 427/288 |
| 4,413,998 | 11/1983 | Guth et al. | 8/477 |
| 4,444,104 | 4/1984 | Mitter | 101/119 |
| 4,444,105 | 4/1984 | Mitter | 101/120 |
| 4,453,462 | 6/1984 | Mitter | 101/120 |
| 4,612,874 | 9/1986 | Mitter | 118/406 |

FOREIGN PATENT DOCUMENTS

| | | | |
|---|---|---|---|
| 47559 | 3/1982 | European Pat. Off. | 101/120 |
| 54628 | 6/1982 | European Pat. Off. | 101/120 |

OTHER PUBLICATIONS

Zimmer; "Printing Deep without Pile Deformation"; *Textile Manufacturer;* pp. 24–25; Oct. 1973; 101/120.
Turner; "Foam Technology: What's it All About?"; Textile Chemist and Colorist; vol. 13, No. 2; pp. 28/13–33/18; Feb. 1981; 8/477.

*Primary Examiner*—David Wiecking
*Attorney, Agent, or Firm*—Cushman, Darby & Cushman

[57] ABSTRACT

The invention relates to a method of printing a substrate in a pattern with a viscous mass in the form of a foam using a screen printing machine.

In order to provide new structures, especially in combination with the printing of fibrous webs, the invention is characterized in that the foam used has meta-stable foam properties. The structure of the foam is maintained intact during transfer and subsequent treatments.

18 Claims, No Drawings

METHOD OF STENCIL PRINTING A SUBSTRATE WITH FOAM

This application is a continuation-in-part of application Ser. No. 677,480 filed Dec. 3, 1984, now abandoned, and application Ser. No. 823,534, the disclosures of each being fully incorporated into the present application by reference.

This invention relates to a method of printing a substrate in a pattern with a viscous mass in the form of a foam using a screen printing machine.

A similar method is disclosed in the published European patent application No. 47 559. The disclosure thereof is incorporated herein by reference. In that application, the use of a foam is mentioned at the end.

Experience with foams hitherto used for this purpose has taught that the pattern printed into the substrate loses the foamed form virtually immediately. The foam bubbles burst before or during drying, and the result is that the material fully comes into direct contact with the substrate. In addition there may be a slight degree of migration.

In the patent application referred to, the use of highly stable foams is explicitly avoided, because they would not be absorbed by the substrate fast enough. For such fast absorption, a lower foam stability is considered essential.

Surprisingly it has now been found that, with the squeegee device described in EP-A No. 47 559, in particular for printing fibrous webs, the use of highly stable foams is quite possible and even may involve a number of technical advantages.

The invention is accordingly characterized by using a foam having meta-stable foam properties. Preferably, the starting point is such a stable foam that the foam structure is substantially maintained during the application in the substrate and during the subsequent drying.

As, during the application of the foam to, or in, the substrate, and during the subsequent transport of the treated substrate, the foam will inevitably be subjected to high shearing forces, a small proportion of the foam cells will loose their original structure and burst. This will generally not be in excess of 10–15% of the cells.

In the case of fibrous webs, one factor is the certain depth to which the foam pressed from the rotation screen can penetrate inwardly. When the foam stability is so high that during and after the passage of the screen the shear forces do not result in unduly high destruction of the external foam structure, a screen print in the form of foam is locally left in the substrate. Surprisingly it has been found that, with sufficiently stable foam, it is possible to print with very sharp contours in this manner and that after drying the original foam form can be maintained. While maintaining the advantages that can be gained by printing with foam on the rotation-screen printing machine, such as accurate dosage per unit area, economic power consumption, and the possibility of fast switching in production batches, this effect additionally gives the advantages directly related to the external foam form of the printing material. This is best seen when the fibrous web is printed with a binder composition brought into the suitable foam form. It can then be seen that not only the location, but the depth of penetration of the printed foam composition can be accurately controlled.

When ejected from the screen, the foam is clearly deposited in the fleece material as an extrusion pillar. By means of this control of the foam distribution all sorts of material effects can be achieved in the final product; not only in decorative respect, but also structurally. This opens up the constructive route to new types of fibrous webs. In these structures, the desired combination of properties can be supported by a suitable material selection of binder type, fiber mixture and web structure. The technique of pattern printing by means of dimensionally stable foam compositions opens up the possibility of introducing new structures by;

a. depositing a sharply defined pattern in the plane of the web. This has a decorative significance, but especially in the case of fibrous webs, also one of surface structure. The binder pattern thus produces a highly flexible web with a limited number of free fibers at the surface.

b. operating with internal binder-free zones, as viewed cross-sectionally of the web, by controlling the depth of penetration of the foam paste. This can be of importance for controlling the absorptive power.

c. using this printing technique by adjustment of the squeegee screen system for applying a relief pattern of dimensionally stable foam.

d. realizing two-fold or multi-fold printings on one or both sides of the web before effecting the after-treatment in the dryer, common to all prints.

All this is demonstrated in the examples, without all possibilities being exhaustively dealt with therein.

These examples also show that, when using dimensionally stable foam paste by means of the screen printing technique only, is it possible to have two or more printing treatments take place synchronously or one immediately after another, and only then followed by drying. The advantage of this treatment as far as process economy is concerned, is evident. Of course, in at least one of these printings the meta-stable foam of the invention should be used.

Synchronously printing a flexible, porous, flat structure, such as a fibrous web, with pastes on opposite sides is described in the published European patent application No. 54628. In it, however, it is on the one hand explicity argued that the two sides should be treated with a different printing technique, and, on the other hand, no use is made of a meta-stable, high-stability foam at all. It is very combination of, on the one hand, the method improved with highly stable foam when using the rotary-screen machine according to EP-A No. 47 559 with, on the other hand, the possibility of applying a plurality of printing treatments at the same time or in series, which possibility has arisen as a result of the highly stable foam, that the subsequent heat drying treatment can take place for all printing treatments at the same time.

The composition of the dimensionally stable foam does not involve any novel particular aspects; the high foam stability can be achieved by using features long since known to the art. Thus, in addition to a suitable surfactant, one may provide for a high viscosity, for the addition of foam stabilizers or anti-desiccants, for the use of low-molecular emulsifiers, and for the use of a high dry content. The dry content should be at least 20%. The higher the content of dry matter, the faster the binder will coagulate upon forced drying, as a result of which the foam structure is maintained.

The composition of matter from which the foam is prepared usually comprises an aqueous dispersion, although it is quite possible to use other solvents or dispersing agents, such as ethylacetate. Advantageously, water is used as this presents little or no environmental problems.

If the binder itself is liquid as can be the case with e.g. epoxy-systems or liquidized, reactive waterfree systems, it is also possible to dispense with the solvent.

Of importance to the dimensionally meta-stable foam, in addition to the composition, is the physical fineness. For the stability it is of importance that the average diameter of the foam bubbles should be less than half the average fiber interspace in the web. The suitability of the foam for the printing process on the rotation-screen machine can be evaluated in various ways. Thus, for example, use can be made of a laboratory high-speed mixer to beat foam to a certain fineness to be expressed in the density in g/l. The higher the density, the coarser the foam bubbles are. The advantageously used valves range between 50 and 300 g/l.

The term "meta-stable" foam as used in this connection means a foam which satisfies the following test.

A volume of 1 l of foam is separated in a measuring cylinder covered, and allowed to stand at 20° C. for 24 hours. Evaluation is then effected by measuring the amount of liquid settled. A foam suitable for use in the dimensionally stable foam paste will exhibit no settled liquid after 24 hours. Such a foam is considered meta-stable.

According to the invention, it is possible to print various substrates. Suitable are, for example, all sorts of textile fabrics, knitted fabrics, for example, a "Raschel" fabric or a tricot fabric, "non-wovens" whether or not in combination with a fabric scrim, foam structures, for example coarse polyurethane foam, and the like.

More in particular it is possible to use a slightly reinforced web such as combined structure of a fibrous web with a network, a woven fabric or a knitted fabric.

Another alternative which can be advantageous is the use of a substrate in the form of a textile structure or a foam structure.

Suitable textile fabrics are cotton and wollen fabrics, and suitable "non-wovens" are especially fibrous webs made from natural fibers, and fibers of synthetic plastics material, but also fibers of glass, carbon and asbestos.

Printing can be effected with all sorts of substances, depending on the final product contemplated. It is not necessary for printing to be effected in a design. It is possible to print the entire surface. Some examples of applications are the binding of a fibrous web, printing a fibrous web in a pattern with a decorative character, decoratively binding a needled web, rendering a substrate water-repellent, or, on the other hand, applying a water-absorbing layer.

According to a preferred embodiment of the invention the said meta-stable foam contains unexpanded microspheres that are pressed into said fibrous web during said foam transfer step.

UK Patent Specification No. 1,427,647 and U.S. Pat. No. 3,676,288 describe the application to, or incorporation in, a fibrous web of non-expanded microspheres by means of a binder, for example, a polyacrylonitrile latex. As the binder is dried and crosslinked, the spheres are attached to the fibrous web and expanded.

Such webs are extremely suitable as a reinforcement for all kinds of cured synthetic plastics materials, such as polyester resin or epoxy resin. In fact, the advantage in using the expanded microspheres in combination with the fibrous web is that the incorporation of the extremely light spheres in the resin is considerably simplified. The use of the microspheres results in a considerable saving of resin and glass fiber, and the mechanical properties of the product reinforced with the web are at least maintained. Rigidity and impact resistance are even improved, and the thermal insulation capacity is enhanced too.

An important point with regard to this invention is that a preferably dimensionally stable foamed binder paste containing the microspheres, then not as yet expanded, can be deposited in the web in a controlled manner, namely so that there is no longer any mass on top of the surface.

This feature has proved to be sufficient to avoid dusting altogether, independent of the kind of microspheres.

An additional advantage of the present invention resides in that a much better reproducibility is obtained.

Pressing the spheres into the fibrous web by means of a foam paste is effected by using a screen printing technique with a dimensionally stable foam paste.

By using a stencil with a suitable pattern, it can be achieved that after the expansion of the microspheres sufficient fiber-containing passages are present in the material to accomplish satisfactory deaeration in the incorporation of liquid resin. Moreover, the patterning of the places with a more free resin supply can be made such as to give a further contribution to the bending stiffness of the resin product to be formed with it.

Surprisingly it has in addition been found that, on a microscale, within the web with expanded spheres, a further improvement has materialized in the uniformity of the spatial distribution of these spheres, which also turns out to contribute favorably to the strength of the resin product to be formed.

In addition it has been found that the impregnation of the web thus obtained with a polyester or epoxy resin is considerably better reproducible. In the state of the art, the reproducibility of the flexural modulus is approximately 25%, whereas according to the present invention this value is about 5%.

An important feature in the method for preparing the fibrous web according to this invention is that the microspheres can be introduced into the web by means of a foam paste. This foam paste consists mainly of the binder for the spheres and the fibrous web.

Preferably the microspheres are arranged in a regular pattern, for example as "islands" that are substantially similar in shape and are separated from each other by areas (channels) containing no microspheres, but only fibers.

In this respect it is remarked, that throughout the application, the words "containing microspheres" are to be understood as indicating an amount of microspheres of at least 10 vol. %, whereas "virtually no microspheres" denotes an amount of at most 5 vol. %.

A further object of the present invention is to provide a specific fibrous web with microspheres dispersed therein for making an article of manufacture reinforced with fibrous webbing, by impregnating the web with liquid resin and a hardener therefor. This object is obtained by the use of a fibrous web provided with microspheres disposed mainly within said web and arranged in a pattern in which areas of the web which contain microspheres are separated from each other by areas which contain virtually no microspheres, for making an article of manufacture reinforced with fibrous webbing by impregnating the web with a liquid resin and a hardener therefor.

The area of the web printed with microspheres amounts in general at least to 75%, preferably 80 to 95%.

After expanding the microspheres, the amount thereof in the web is in general 10 to 60 vol. %. This amount depends on the amount of microspheres used and the degree of expansion thereof.

The microspheres to be used preferably consist of a thermoplastic synthetic resin material that is solid at room temperature.

In the spheres, a chemical or physical blowing agent has been incorporated. The various components, binder, synthetic resin and blowing agent are preferably so attuned to each other that during the drying of the impregnated fibrous web on the one hand the binder is hardened and cross-linked, and on the other hand at the same temperature the sphere is expanded.

The spheres may consist of, possibly filled, synthetic resins, such as polystyrene, styrene copolymers, polyvinyl chloride, vinyl chloride copolymers, vinylidene chloride copolymers and the like.

The blowing agent may be a chemical or physical blowing agent, such as azodicarbonamide, isobutane, Freon, and the like.

The spheres advantageously have a diameter of 4-20/μm in the unexpanded state. After expansion the diameter is preferably 10-100/μm.

The fibrous web produced in accordance with this invention is, in particular, very suitable for use as a core material for objects made of all kinds of synthetic resins, such as polyester resin or epoxy resin.

One aspect of the prior art material is the phenomenon that the microspheres readily become detached from the surface of the web when the latter is manipulated. On the one hand this is a result of the way of impregnation, which it has hitherto been impossible to improve, and on the other hand of the limited content of binder latex required for the strength of the product formed in the process wherein the kind of microspheres used also plays a role. If only a very low proportion of the microspheres become detached, their fineness accounts for dusting in the workshop, which may be quite a nuisance from time to time. This problem can be met by the use of a specific kind of microspheres. This restricts however the freedom of choice.

When, during manufacture, the fibrous web has passed the impregnation trough, and subsequently has been pressed between two Foulard rolls, this results in a fractionally non-uniformly and locally varying coverage with binder composition of the surface of the web as it leaves the nip. This local variation has a meandering effect, which, it is true, is hardly noticeable as the web leaves the nip, but is much more clearly manifest when the microspheres have later expanded from heating. After expansion, these local extra depositions of microspheres give the web surface a clearly irregular aspect, with fiber coverage and hence integrity being diminished at the "tops".

An important point in the choice of the specific machine and the adjustment thereof is that the foam is introduced into the fibrous web. The amount that may be present on or at the surface is a very small one only, because otherwise, specifically, the dusting of spheres is not suppressed.

As indicated above, the foam can be introduced into the fibrous web in a pattern. In addition it is possible to apply the foam throughout the entire surface.

The pattern chosen depends fully on circumstances and specific requirements which the final product should satisfy. In addition it is possible to apply a certain decorative pattern. Such a pattern need not specifically contribute to the mechanical properties of the final product.

It is also possible for the web to be printed from both sides, with the same pattern being applied twice at the same location. This may be of advantage in the case of thick webs. It is also possible to apply different patterns, for example, a mirror-image pattern, with foam being introduced on one side where it is not at the other side, and the other way round.

A suitable pattern which also contributes to the strength of a reinforced synthetic resin sheet to be made with the impregnated fibrous web is a honeycomb structure.

The foam paste used is stable to such an extent, that the usual shear forces acting on the foam during and after printing do not cause substantial destruction of the foam. Generally speaking, at least 85-90% of the foam cells is maintained. The composition of the dimensionally stable foam does not constitute any novel particular aspects; the high foam stability can be achieved by using measures well known in the art. Thus, in addition to a suitable surfactant, a high viscosity can be provided, foam stabilizers may be added, or substances preventing desiccation, low-molecular emulsifiers may be used, and a high dry content ensured. The dry content is preferably at least 20% by weight. The higher the content of dry matter, the faster the binder will coagulate upon forced drying, as a result of which the foam structure is maintained.

Of importance to a dimensionally stable foam, in addition to its composition, it is physical fineness. An important point to ensure stability during printing is that the average diameter of the foam bubbles should be less than half the average fiber interspace in the web. The suitability of the foam for the printing process on the rotary-screen machine can be evaluated in various ways. Thus, for example, use can be made of a high-speed laboratory mixer to beat foam to a certain fineness to be expressed in its density in g/l. The higher the density, the finer the foam bubbles are. The conventional values range between 50 and 300 g/l. Of this foam, a volume of 1 l can be separated in a graduated cylinder and allowed to stand in an environmental chamber at 20° C. for 24 hours. Evaluation is then effected by measuring the amount of liquid settled. A foam suitable for use in the dimensionally stable foam paste will exhibit no settled liquid after 24 hours.

The meta-stable foam used in the present invention is prepared starting from known components. Generally speaking, the composition from which the foam is made contains water, a binder, a thickener, a surfactant (wetting agent), a foam stabilizer and possibly a filler. Depending on the final product contemplated, the composition contains one or more other substances to be applied to the substrate. These may be, for example, pigments, water-proofing compounds, compounds providing water absorbency, binders, antioxidants, functional compounds such as carbon black, and the like.

Binders suitable for use in the present invention are lower alkylacrylates, styrene-butadiene rubber, acrylonitrile rubber, polyurethane, epoxy-resins, polyvinylchloride, polyvinylidenechloride and copolymers of vinylidene chloride with other monomers, polyvinylacetate, partially hydrolyzed polyvinylacetate, polyvinyl-alcohol, polyvinylpyrrolidone, and the like. Optionally these binders can be provided with acidic groups, for example by carboxylating them. A suitable carboxylating agent is for example maleic anhydride.

Suitable surfactants are of the anionic or non-ionic type, such as soaps, alkyl-aryl sulfonates, fatty alcohol sulfates, ethoxylated fatty acid compounds and the like.

As foam stabilizers suitable for use in the present invention the following compounds can be used: fatty acid-amide condensates, ammonium- and potassium stearate, cyclohexanole alkylamino salts of acetic acid, formic acid and propionic acid, tertiary amino oxides and the like.

The fillers to be used in connection with the present invention are the usual fillers for foam printing, and comprise pigments, active components such as carbon black, hydrated alumina, blown silica, etc.

In the context of the present invention, one would not readily resort to the use of fillers in addition to the microspheres, it is possible to use colors, active components, such as carbon black, hydrated alumina, blown silica, and the line, in combination therewith.

The particle size of the fillers is preferably at most $20/\mu m$, as the presence of larger particles can interfere with the process of the invention.

The foam composition is to be converted into a metastable foam in known manner, for example, by beating the composition in a high-speed mixer with air or another gas.

The invention is also directed to a printed substrate produced with the method of the invention. These printed substrates are novel products as set out hereinbefore.

In the following Examples I to VI, the use of metastable foam is illustrated. Table A specifies the properties of the foams used.

EXAMPLE I

Bonding and dot-printing a web in one pass for making an adhesive interlining.

A fibrous web of 30 g/m$^2$, consisting of 50% 1.7 dtex, 40 mm viscose fibers, 40% 1.7 dtex, 60 mm polyester fibers and 10% polyester melting fiber having a melting point of 130° C., is thermo-fixed with hot air and then printed on a rotary screen machine, by means of a patterned stencil having an open area of 25%, with a quantity of 25 g/m$^2$ meta-stable foam on the basis of a latex of carboxylated butylacrylate resin having a dry content of 40% and a foam density of 200 g/l. At the same time, or immediately thereafter, the web is printed on the same machine, and in register with the preceding print pattern with dots of a latent adhesive by means of a stencil of a similar pattern but with smaller apertures, so that the open area is now 10%. The latent adhesive is a copolyamide solution in p-toluenesulfonamide having a dry content of 30%, which is applied in a quantity of 50 g/m$^2$.

After this double screen printing passage, the web is uniformly dried, gelled and cured for 30 seconds at 150° C.

The registered prints can be applied, as desired, on the same side of the fibrous web or on opposite sides. Rotation-screen machines equipped for this purpose are known per se.

EXAMPLE II

Bonding a fibrous web in unicolour with stable foam and dot-printing with a latent adhesive.

A fibrous web of 50 g/m$^2$, consisting of 30% 1.7 dtex, 40 mm nylon 66 fibers, 60% 3.3 dtex, 40 mm nylon 66 fibers and 10% 1.7 dtex, 40 mm polypropylene/fibers, is thermofixed and subsequently printed on a rotary screen machine with 75 g/m$^2$ stable foam on the basis of a latex of soft carboxylated styrene-butadiene rubber having a dry content of 20% and a foam density of 100 g/l by means of a rotation screen with a fineness of 60 mesh and an open area of 45%. Subsequently the fibrous web thus treated is dot-printed with a quantity of 30 g/m$^2$ of a copolyester solution provided with a foaming agent, having a dry content of 30%, by means of a rotation screen having a fineness of 17 mesh. After these two printing passages, the binder is uniformly dried and hardened in a furnace, and at the same time the printed dots of the latent copolyamide adhesive are foamed and gelled. This heat passage at 150° C. takes 40 seconds. The product is suitable for use as an interlining.

EXAMPLE III

Decoratively bonding of a needled web by means of pigmented foam binders.

A 1.1 mm thick needled web of 150 g/m$^2$, consisting of 100% 1.7 dtex, 40 mm polyester fibers, and rigidified under a light calendar pressure at 220° C., is passed along three rotary-screen stencils, whereby, successively, the following binder compositions are applied:

a. a quantity of 25 g/m$^2$ of an instable foam on the basis of a light-grey pigmented carboxylated acrylate latex having a dry content of 40%, exhibiting soft rubber characteristics and having a foam density of 100 g/l. Printing was effected with a regular open-screen stencil having a fineness of 60 mesh under such a pressure in the internal squeegee system that the binder penetrates 0.25 mm into the fleece.

b. by means of a patterned stencil having an open area of 60%, a quantity of 6.5 g/m$^2$ of a dimensionally stable foam, having a dry content of 34% on the basis of a light-grey pigmented latex of a soft crosslinkable polyurethane having a foam density of 100 g/l. This foam is caused to penetrate 0.1 mm into the fleece.

c. by means of a patterned stencil having an open area of 10%, a quantity of 2.0 g/m$^2$ of a dimensionally stable foam, having a dry content of 43%, on the basis of a dark-grey pigmented latex of soft crosslinkable polyurethane having a foam density of 200 g/l. This foam is caused to penetrate 0.1 mm into the fleece.

After these threepassages, the product is dried in a furnace and hardened at 160° C. for 2 minutes. The product can be used as a suitcase liner.

EXAMPLE IV

Bonding and at the same time oil-proofing and waterproofing a non-woven structure.

A 1.0 mm thick fibrous web of 60 g/m$^2$, consisting of a mixture of black polyester fiber of 30% 1.7 dtex/40 mm and 60 f 3.3 dtex/40 mm and 10% of glossy polyester melting fiber having a melting point of 130° C., is after thermofixation, bonded by means of a rotary screen having an entirely open, i.e. non-patterned, screen area whereby it is laden with a quantity of 100 g/m$^2$ of a dimensionally stable foam having a dry content of 30% on the basis of a latex of non-filled, hard, crosslinkable acrylate rubber. Foam density is 100 g/l. This first rotary-screen passage is followed by a second passage along a rotary screen that is also open, and whereby, on the same side of the web, a quantity of 10 g/m² of dimensionally stable foam mixture, with a dry content of 20%, on the basis of a non-filled composition of melamine-fatty acid condensate and a fluorocarbon in the form of an emulsion. Foam density is 100 g/l. The depth of penetration of the latter passage is 0.1 mm. These two rotary-screen passages are followed, for drying and complete cross-linking by a treatment in a furnace in 130° C. for 2 minutes. The product can be used for upholstery in motorcars.

EXAMPLE V

Printing webbing with different foam mixtures in a pattern.

A 2.0 mm thick white polyester fibrous web consisting of a mixture of 30% 5.0 dtex/50 mm, 40% 17.0 dtex/80 mm and 30% 3.3 dtex/40 mm, with 40% of the kind last-mentioned consisting of a melting fiber having a softening range of 160°-220° C. is, after fixation at 220° C., printed by means of two immediately consecutive rotary screen passages.

The first screen has a pattern with 80% free apertures of the screen area. By means of this screen, a quantity of 145 g/m² of a dimensionally stable foam composition, having a dry content of 45%, on the basis of a latex of a hard methylmethacrylate resin with a foam density of 100 g/l is applied.

The second screen is patterned with 20% free apertures of the screen area and prints the substrate in registry with the pattern of the first screen, namely, on the still open substrate portions. This is effected by means of a dimensionally stable foam containing 100% epoxy resin and having a foam density of 200 g/l, in a quantity of 100 g/m².

After the two printing passages, the product is substantially dried at 150° C. for 2 minutes and then subjected to after-drying and hardening at 140° C. for 1 minute.

The product obtained cannot be crushed, and can be used as a flexible spacer for lamination.

EXAMPLE VI

Application of a non-corrosive water-absorbent layer to a web.

A polyester fibrous web of 40 g/m², consisting of 90% 1.7 dtex/40 mm and 10% 1.7 dtex melting fiber having a melting point of 130° C., and having a ratio in tensile strength in the longitudinal and transverse directions of 5:1 is provided by means of a rotary screen with a continuous top coating of 115 g/m² of dimensionally stable foam on the basis of polyvinyl alcohol solution in vinylacetate, having a dry content of 40%, with 30% of the dry matter consisting of super-absorbent acrylate powder. Foam density is 150 g/l.

Immediately thereafter, in a next rotary screen pass, the same side of the web is provided with a dose of 10 g/m² of an instable, thickened foam, having a dry content of 10%, and a foam density of 200 g/l, on the basis of a solution of benzotriazole in ethanol. The product is dried and hardened at 50° C. for 1 minute.

In the following Table A, some properties of the various foam compositions are set forth. Please note that the foam stability and the meta-stability tests are two different tests. In the first one the ratio (m%) between the original volume of the foam and the volume after the specified time is given. This test is used to evaluate meta-stable foams among each other. The last test indicates if a foam is meta-stable or not.

TABLE A

| Ex. | composition | pH | Visc. (cp) 10 rev/m | Visc. (cp) 100 rev/m | Dry matter wt. % | Foam stability after ... hours | meta-stability* |
|---|---|---|---|---|---|---|---|
| I | butylacrylate resin latex | 9 | 2300 | 560 | 40.0 | 100 g/l: 92% (96 h) 200 g/l: 95% (96 h) | + |
| II | soft SBR latex | 9 | 2500 | 540 | 20 | 100 g/l: 90% (96 h) | + |
| III(a) | non-stable soft carboxylated acrylate latex | 9 | 70 | 50 | 40,0 | 70 g/l: 0% (24 h) 100 g/l: 0% (24 h) | — |
| III(b) | polyurethane binder | 9 | 1600 | 900 | 34,0 | 100 g/l: 90% (96 h) | + |
| IV(a) | hard, crosslinkable acrylate latex | 9 | 4600 | 1100 | 30,0 | 100 g/l: 95% (48 h) 165 g/l: 95% (48 h) | + |
| IV(b) | fluoro-carbon emulsion | 6,2 | 4400 | 800 | 20,0 | 100 g/l: 85% (24 h) | + |
| V(a) | hard, methyl-methacrylate resin/ PVDC-dispersion | 9 | 3600 | 1500 | 45 | 100 g/l: 85% (96 h) 150 g/l: 90% (96 h) | + + |
| V(b) | epoxy-resin binder | — | 90000 | 14500 | 100 | 350 g/l: 80% (24 h) (pot-life appr. 8 h) | + |

*+ satisfies the test for meta-stability
— does not satisfy the test for meta-stability In Table B, the composition of the various printing compositions is given. In the column headed "amount" the amount of product (emulsion, powder etc.) is given, inclusive of solvent etc. In the last column, the composition is given in % with respect to the total amount of dry matter.

TABLE B

| Ex. | type | composition compound | amount (wt. parts) | % dry content |
|---|---|---|---|---|
| I | butylacrylate resin latex | soft carboxylated butyl-acrylate polymer dispersion | 1000 | 94,6 |
| | | NH₄Cl solution | 15 | 0,3 |
| | | acrylic acid thickener | 15 | 0,9 |
| | | ammonium stearate dispersion | 60 | 3,6 |
| | | 2-amino-2-hydroxyethylpropane | 3 | 0,6 |
| | | water | 145 | — |
| IIa | SBR-foam binder | soft carboxylated SBR copolymer dispersion | 970 | 79,4 |

TABLE B-continued

| Ex. | type | composition compound | amount (wt. parts) | % dry content |
|---|---|---|---|---|
| | | 3-methoxy-methylmelamine | 56 | 9,5 |
| | | HCl-salt of 2-amino-2-hydroxy-methylpropane | 13 | 0,8 |
| | | acrylic acid thickener | 60 | 3,6 |
| | | 2-amino-2-hydroxymethylpropane | 4 | 0,6 |
| | | ammonium stearate | 60 | 3,6 |
| | | green pigment-dispersion | 25 | 2,5 |
| | | water | 1300 | — |
| IIb | adhesive composition (30.0% dry matter) | copolyester powder | 400 | 96,4 |
| | | stabiliser | 4 | 1,0 |
| | | acrylate thickener | 24 | 2,0 |
| | | TiO$_2$ dispersion | 4 | 0,5 |
| | | optical whitener | 1 | 0,1 |
| | | water | 1000 | — |
| IIIa | acrylate-foam binder | soft carboxylated acrylate resin dispersion | 475 | 43,4 |
| | | dimethoxy methyl dihydroxy-ethylene ureum | 12 | 1,1 |
| | | trimethoxy methyl melamine | 13,5 | 2,5 |
| | | hard carboxylated methacrylate dispersion | 526 | 52,6 |
| | | acrylic acid thickener | 5 | 0,3 |
| | | carbon black pigment | 1,5 | 0,1 |
| | | stabilizer | 1 | 0,2 |
| | | water | 216 | — |
| IIIb | polyurethane binder | soft, crosslinkable polyurethane dispersion | 1395 | 92,5 |
| | | aziridine complex | 15 | 3,0 |
| | | acrylic acid thickener | 8 | 0,5 |
| | | carbon black pigment | 5 | 0,3 |
| | | 2-amino-2-hydroxymethyl propane | 0,5 | 0,1 |
| | | ammonium stearate | 60 | 3,6 |
| IVa | acrylate-based binder | hard, crosslinkable acrylate copolymer dispersion | 947 | 89,1 |
| | | phosphoric acid thickener | 400 | 7,5 |
| | | ammonia | 6 | 0,1 |
| | | ammonium stearate | 60 | 3,3 |
| | | water | 621 | — |
| IVb | fluoro-carbon based emulsion | fluorocarbon emulsion | 542 | 20,5 |
| | | melamine-fatty acid condensate | 469 | 9,5 |
| | | amphoteric foam stabilizer | 13 | 1,6 |
| | | soft acrylate binder | 1080 | 62,6 |
| | | polyphosphate thickener | 50 | 5,8 |
| | | water | 1720 | — |
| Va | methyl-methacrylate based binder | hard acrylate polymer dispersion | 500 | 37,2 |
| | | polymeric filler based upon PVDC | 500 | 52,2 |
| | | wetting agent based upon poly-amino-amide | 150 | 5,6 |
| | | acrylic acid thickener | 30 | 1,3 |
| | | acetic acid salt of fatty-amine complex | 19 | 2,8 |
| | | dimethyl-ethanolamine | 5 | 0,7 |
| | | TiO$_2$ dispersion | 3 | 0,2 |
| | | water | 250 | — |
| Vb | epoxy resin based binder | epoxy resin (bisphenol F) | 1000 | 37,4 |
| | | curing agent (isophoron complex) | 550 | 20,6 |
| | | foam stabilizer | 45 | 1,7 |
| | | plasticizer | 75 | 2,9 |
| | | aluminium-trihydrate (1-2 μm) | 1000 | 37,4 |

EXAMPLE VI

A 2.5 mm thick white needled web of 130 g/m$^2$ consisting of 85% by weight of 5.0 dtex/50 mm polyester fiber and 15% by weight of 7.0 dtex melting fibers with a softening temperature of 130°-150° C., which swells or dissolves in polar or aromatic solvents, is fixed in a furnace at 160°-180° C.

Subsequently the web is printed on a rotary screen machine with a hexagonally formed pattern with an open area of 80% of the basic stencil. During this process, 220 g/m$^2$ of a dimensionally stable foam composition is applied, the composition of which is given in Table C with a 35% dry content on the basis of a latex of a hard polyester resin, with 40% of the dry content consisting of microspheres and a foam density of 100 kg/m$^3$. In this printed fixed needled web, the microspheres are subsequently expanded by means of steam and subsequently dried and cured at 130° C.

The resulting product is suitable for use as a core material in the reinforced synthetic resin sector.

TABLE C

| | Parts by weight in the mixture | |
|---|---|---|
| | wet (parts) | dry (%) |
| hard polyester polymer dispersion | 850 | 25.6 |
| microspheres on the basis of PVDC-Copol | 500 | 38.5 |
| humidifier on the basis of polyaminoamide | 150 | 4.2 |
| Hexa Methylol Melamine | 136 | 15.3 |
| catalyst | 25 | 2.8 |
| acetic acid salt of fatty amine complex | 19 | 2.1 |
| polyphosphate thickening agent | 500 | 11.5 |
| water | 600 | |

EXAMPLE VII

The resulting improvement in bending stiffness by the use of the fibrous web according to the present invention in fiber-reinforced polyester, as compared with known fibrous webs, can be elucidated in the light of a comparison of laminate properties. The starting product is the same basic web, which is provided with the expandable binder in two ways, namely, the known method in which, by saturation binding by fouldarizing, a viscous expandable binder with a dry content of 16% is applied, and the method according to the present invention, in which an expandable binder with a dry content of 45% is applied in a pattern by means of stable-foam printing. The basic fleece is a 100% polyester randowebber fleece, consisting of 20% by weight of 4.7 dtex/35 mm and 80% by weight of 1.7 dtex/60 mm fiber and bonded to a fiber : binder ratio by weight of 80-20 with a thermoplastic methylmethacrylate binder. Part of the resulting basic fleece, which weighs 100 g/m² and is 1.6 mm thick, is post-bonded by the old method using the expandable binder on the basis of polyacrylic acid as specified in Table D below by means of fouldarizing and with a squeeze effect of 280%, with the result that, after drying, 40 g/m² of the microspheres is set. Another part is treated in accordance with the present invention using a rotary-screen foam printing machine with a stencil with a honeycomb structure, the ribs of which are 4 mm long, and with the expanded area being 90% of the total area. The depth of penetration of the stable foam, with a dry content of 45% and a foam density of 100 kg/m³ in the web is 1.4 mm; the area actually printed is now 80%. The result is that, after drying, 40 g/m² of the microspheres is set. Both expanded webs are 4.2 mm thick, measured under a pressure of 40 g/cm², and have a foam volume of 2.2 l/m². Both webs are formed into laminates having the following structure:

1×300 g/m² glass mat
1×450 g/m² glass mat
1×4 mm of the above expanded webs
1×450 g/m² glass mat
1×300 g/m² glass mat.

These mats are successively superimposed, and impregnated with polyester resin. Total resin consumption is 6030 g/m². The total thickness of the laminate is 7.6 mm; its weight per m² is 7670 g and it has an S value of 0.55 (S=thickness expanded web/thickness laminate).

By means of the 3 point bending test according to DIN 53457 the $E_{mod}$ is determined with a ratio of slenderness $\lambda$ ($\lambda$=length between support points/total thickness) of 10 and 30.

It has now been found that, as compared with a 35 weight % glass-reinforced solid polyester panel ("full-laminate") with an $E_{mod}$ of 8400 N/mm², the sandwich laminates with an S value of 0.55, made in accordance with the state of the art, at $\lambda$=30 have an $E_B$ of 6600 N/mm² and at $\lambda$=10 an $E_B$ of 5650 N/mm². If it is desired to have the same bending strength as that of the full laminate the sandwich laminate must be 8% and 14% respectively, thicker than of the full-laminate.

When the above new core material is used, the moduli found are 8400 N/mm² at $\lambda$=30 and 7900 N/mm² at $\lambda$=10. This differs so little from the $E_{mod}$ of the full-laminate that oversizing is hardly necessary, but the resin saving is 2 l/m².

TABLE D

| | parts by weight | |
|---|---|---|
| | wet (parts) | dry (%) |
| Binder on the basis of polyacrylic acid for saturation impregnation. | | |
| polyacrylic acid dispersion | 27.5 | 2.1 |
| microspheres on the basis of PVDC-Copol | 500 | 90.1 |
| 2-amino-2-hydroxy-methylpropane | 5 | 1.2 |
| humidifier on the basis of polyaminoamide | 103 | 6.6 |
| water | 1800 | |
| Stable foam binder on the basis of a polyacrylic acid | | |
| polyacrylic acid dispersion | 45 | 2.7 |
| microspheres on the basis of PVDC-Copol | 600 | 82.7 |
| 2-amino-2-hydroxy-methylpropane | 8 | 1.5 |
| humidifier on the basis of polyaminoamide | 180 | 8.9 |
| acetic acid salt of fatty acid amine complex | 22 | 4.2 |
| water | 275 | |

EXAMPLE VIII

The application of a heat expandable material to a web.

A fibrous web consisting of 25 g/m² fibers, of which 50% by weight is polyester 1.7 dtex 40 mm and 50% by weight polyacryl 1.7 dtex 40 mm, and 15 g/m² polyacrylate binder is provided with transversely oriented bands of heat-expandable material. The expansion of the bands takes place mainly in the direction of thickness of the web. The expandable material is produced by mixing a low boiling liquid containing PVDC microspheres with a polyacrylate binder in a ratio of microspheres/binder of 3:1 (calculated as dry material) to which a suitable foam stabilizer, ammonium stearate, has been added. The formulation of this composition is given below in Table E.

This mixture is frothed up to form a foam volume of 150 g/l and applied to the web in the desired pattern by means of a rotary screen machine. The material applied is 10 to 40 g/m² of dry weight, calculated on the printed surface area.

Drying is effected at a temperature lower than the expansion temperature of the spheres. The transverse bands may be 2 to 10 mm wide with an interspacing ranging from 10 mm to 300 mm.

The potentially expandable material produced in the above way can be used for all sorts of engineering applications in which the incorporation of a fiber reinforcement and/or local swelling during the further manufacturing process is desirable. Possible uses are in the rubber industry, for moldings, building (decorative facings applicable by means of steam), etc.

The use of potentially expandable material may in addition be a means of reducing cost of transportation.

TABLE E

| Stable foam binder with microspheres | Parts by weight, % | |
| --- | --- | --- |
| | wet | dry |
| Medium-hardness cross-linkable polyacrylic acid dispersion | 100 | 19.8 |
| Microspheres on the basis of PVDC Copol | 225 | 62.3 |
| Humidifier on the basis of phenol derivative | 4 | 1.3 |
| Foam stabilizer ammonium stearate | 120 | 11.9 |
| Acrylic acid thickener | 40 | 4.7 |
| Water | 900 | |

What is claimed is:

1. A method of printing a substrate comprising the following steps:
   a. employing at least one screen printing machine having at least one patterned stencil;
   b. transferring a foam having meta-stable foam properties into said substrate through said stencil, resulting in a printed pattern; and
   c. subjecting the substrate to a fixation treatment by drying said printed pattern in said substrate so that said printed substrate has substantially retained the structure of said foam and the pattern of said stencil, said pattern in said printed substrate being a viscous mass in the form of a foam.

2. A method according to claim 1, wherein said substrate is a fibrous web.

3. A method according to claim 1 wherein said screen printing machine includes a squeegee system, said squeegee system having a pressure applied within said squeege system so that when transferred to the substrate, said foam can penetrate the substrate to a desired, adjustable depth while maintaining its foam structure.

4. A method according to claim 1, wherein said substrate is printed at least two times, using at least one of said screen printing machines each having one of said rotating stencils before subjecting the substrate thus printed to said fixation treatment.

5. A method according to claim 4, wherein said step of printing with said rotating stencils occurs simultaneously and in registry, on opposite sides of the substrate.

6. A method according to claim 4, wherein said step of printing with said rotating stencils is carried out using a plurality of viscous pastes, at least one of which is said meta-stable foam.

7. A method according to claim 1, wherein the substrate has a structure resulting from the combination of a fibrous web with a net-like structure.

8. A method according to claim 1, wherein the substrate has a woven structure.

9. A method according to claim 1, wherein the substrate has a foam structure.

10. A method according to claim 1, wherein the substrate has a structure resulting from the combination of a fibrous web with a woven fabric.

11. A method according to claim 1, wherein the substrate has a structure resulting from the combination of a fibrous web with a knitted fabric.

12. A method according to claim 2, wherein said foam contains unexpanded microspheres that are pressed into said fibrous web during said foam transfer step.

13. A method according to claim 12, wherein after said unexpanded microspheres are pressed into said fibrous web, said microspheres are expanded.

14. A method according to claim 12, wherein said microspheres are arranged in a regular pattern.

15. A method according to claim 14, wherein the printed areas of said fibrous web substrate, containing said microspheres are substantially similar in shape, and said printed areas are separated from each other by unprinted areas containing virtually no microspheres.

16. A method according to claim 12, wherein at least 75% of said web is printed with said microspheres.

17. A method according to claim 12, wherein between 80 to 95% of said web is printed with said microspheres.

18. A method according to claim 13, wherein after said expansion of microspheres, 10–60% by volume of said web is occupied by said expanded microspheres.

* * * * *